United States Patent
Lee et al.

(10) Patent No.: US 12,216,853 B2
(45) Date of Patent: Feb. 4, 2025

(54) CONVERTING INTEGRATOR, TOUCH DRIVING CIRCUIT, AND TOUCH DISPLAY DEVICE

(71) Applicant: LG Display Co., Ltd., Seoul (KR)

(72) Inventors: Hongju Lee, Seoul (KR); Hyunwoo Kim, Seoul (KR); Jaekyu Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/389,501

(22) Filed: Nov. 14, 2023

(65) Prior Publication Data

US 2024/0220045 A1 Jul. 4, 2024

(30) Foreign Application Priority Data

Dec. 29, 2022 (KR) ........................ 10-2022-0189373

(51) Int. Cl.
G06F 3/044 (2006.01)
G06F 3/041 (2006.01)
(52) U.S. Cl.
CPC .................................. G06F 3/0416 (2013.01)
(58) Field of Classification Search
None
See application file for complete search history.

(56) References Cited

U.S. PATENT DOCUMENTS

| 2006/0290677 | A1 | 12/2006 | Lyon et al. |
| 2014/0210491 | A1* | 7/2014 | Jonsson ............... G06F 3/0443 |
| | | | 324/661 |
| 2020/0142532 | A1 | 5/2020 | Kravets et al. |
| 2021/0117035 | A1 | 4/2021 | Kim et al. |

FOREIGN PATENT DOCUMENTS

| JP | 10-149250 A | 6/1998 |
| JP | 2013-214327 A | 10/2013 |
| KR | 10-2021-0036660 A | 4/2021 |
| TW | 201115213 A1 | 5/2011 |
| TW | 201917550 A | 5/2019 |
| TW | 202132961 A | 9/2021 |

* cited by examiner

*Primary Examiner* — Carl Adams
(74) *Attorney, Agent, or Firm* — Birch, Stewart, Kolasch & Birch, LLP

(57) ABSTRACT

A touch display device can include a plurality of touch electrodes disposed on or in a display panel; and a touch driving circuit configured to drive the plurality of touch electrodes by outputting a touch driving signal having a first level period and a second level period. Also, the touch driving circuit includes a current regulator configured to receive an input current from at least one of the plurality of touch electrodes during at least a partial period of the first level period and at least a partial period of the second level period of the touch driving signal, and scale down the input current to a first current and output the first current; and a converting integrator configured to output a sensing voltage based on the first current or a second current adjusted from the first current.

19 Claims, 12 Drawing Sheets

CONVERTING INTEGRATOR, TOUCH DRIVING CIRCUIT, AND TOUCH DISPLAY DEVICE

CROSS-REFERENCE TO RELATED APPLICATION

This application claims priority under 35 U.S.C. § 119(a) to Korean Patent Application No. 10-2022-0189373, filed in the Republic of Korea on Dec. 29, 2022, the entirety of which is hereby incorporated by reference for all purposes as if fully set forth herein.

BACKGROUND

Field

Embodiments of the disclosure relate to a converting integrator, a touch driving circuit, and a touch display device.

Description of Related Art

Touch display devices can recognize the user's touch on the display panel displaying images and provide a function of performing input processing based on the recognized touch, in addition to image display functionality.

A touch display device can include, e.g., a plurality of touch electrodes and a plurality of touch lines disposed on the display panel for touch sensing. The touch display device can sense the user's touch on the display panel by detecting a change in capacitance caused by the user's touch by a touch driving circuit driving the touch electrodes and touch lines.

The touch driving circuit can include various circuit elements, and the accuracy and efficiency of touch sensing can vary depending on the touch driving circuit. Also, certain elements within the touch driving circuit may degrade overtime which reduces the life span of the device. Oftentimes, the touch driving circuit may include some portions that use circuit elements that operate in a high voltage range while other portions of the touch driving circuit may include circuit elements that operate in a low voltage range, this mismatch in optimal operating ranges can lead to stress on the touch driving circuit, increased noise within the device and impairments over time as well as increased power consumption. A need exists for a touch driving circuit that can optimize the configuration when using different types of circuit elements included in the touch driving circuit and improve the performance of touch sensing, extend the life span of the device and reduce power consumption.

SUMMARY OF THE DISCLOSURE

Embodiments of the present disclosure can improve or better maintain the performance of touch sensing by a touch driving circuit and optimize circuit elements included in the touch driving circuit. Embodiments of the present disclosure can also extend the life span of the device and reduce power consumption.

Embodiments of the disclosure can provide a touch display device comprising a plurality of touch electrodes disposed on a display panel and a touch driving circuit driving the plurality of touch electrodes and outputting a touch driving signal having a first level period and a second level period, in which the touch driving circuit includes a current regulator outputting a first current produced by scaling down an input current received from at least one of the plurality of touch electrodes during at least a partial period of the first level period and the second level period of the touch driving signal and a converting integrator configured to output a sensing voltage by outputting, at least one time, a voltage according to the first current or a second current adjusted from the first current.

Embodiments of the disclosure can provide a touch driving circuit comprising a current regulator configured to output a corrected current produced by scaling down an input current received from a touch electrode to which a touch driving signal having a first level period and a second level period is applied and a converting integrator configured to output a sensing voltage by integrating a voltage according to the corrected current in each of the first level period and the second level period of the touch driving signal.

Embodiments of the disclosure can provide a converting integrator comprising a first integration block including a first positive integration switch electrically connected to an input end of a sensing current and a positive integration capacitor electrically connected between the first positive integration switch and an input end of an integration reference voltage, and integrating a voltage according to the sensing current input during the first level period of the touch driving signal, a second integration block including a negative integration capacitor and a first negative integration switch electrically connected between a node between the negative integration capacitor and the input end of the integration reference voltage and the input end of the sensing current, and integrating the voltage according to the sensing current input during the second level period of the touch driving signal, and a gain buffer configured to output the sensing voltage based on the voltages integrated by the first integration block and the second integration block.

According to embodiments of the disclosure, a touch driving circuit that reduces circuit elements included in the touch driving circuit can save space and resources, and improves the performance and efficiency of touch sensing. Further, the touch display device is capable of saving power consumption by reducing power consumption by such a touch driving circuit.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION OF THE EMBODIMENTS

Figure 1:
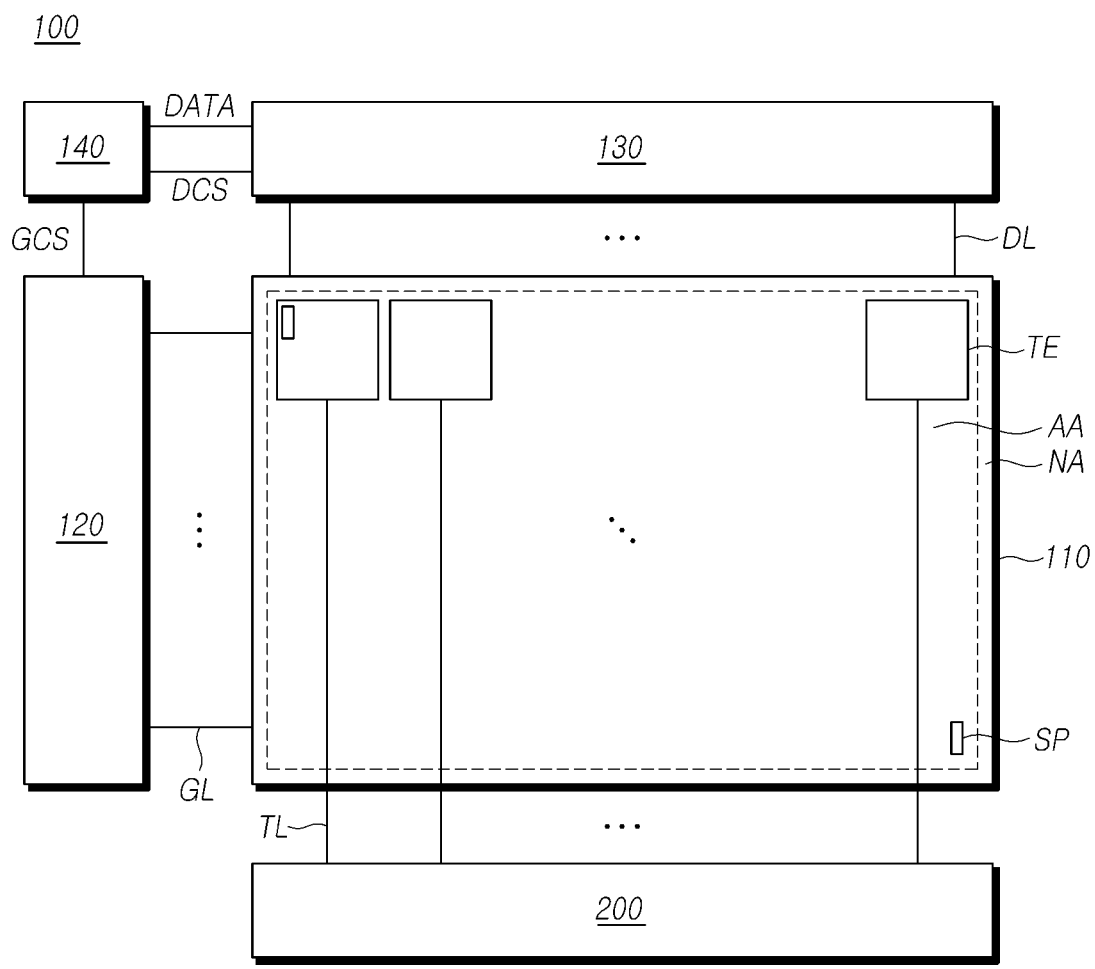
FIG. 1 is a view schematically illustrating a configuration of a touch display device according to embodiments of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" can be used herein to describe elements of the present disclosure. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element can be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can."

The features of various embodiments of the present disclosure can be partially or entirely coupled to or combined with each other and can be interlocked and operated in technically various ways, and the embodiments can be carried out independently of or in association with each other.

Hereinafter, various embodiments of the present disclosure will be described in detail with reference to accompanying drawings.

FIG. 1 is a view schematically illustrating a configuration of a touch display device 100 according to embodiments of the disclosure.

Referring to FIG. 1, a touch display device 100 can include a display panel 110 and a gate driving circuit 120, a data driving circuit 130, and a controller 140 for driving the display panel 110.

The display panel 110 can include an active area AA in which a plurality of subpixels SP are disposed and a non-active area NA positioned outside the active area AA.

The display panel 110 can include a plurality of gate lines GL, a plurality of data lines DL, and subpixels SP at the crossings of the gate lines GL and the data lines DL.

The touch display device 100 can include a plurality of touch electrodes TE disposed on the display panel 110 for touch sensing. The touch display device 100 can include at least one touch driving circuit 200 that drives the touch electrode TE.

The plurality of touch electrodes TE can be disposed in the active area AA. Each of the plurality of touch electrodes TE can be disposed in an area corresponding to two or more subpixels SP.

A plurality of touch lines TL electrically connected to the touch electrodes TE can be disposed on the display panel 110.

A configuration for display driving in the touch display device 100 is described. The gate driving circuit 120 can be controlled by the controller 140 to sequentially output scan signals to the plurality of gate lines GL disposed in the display panel 110, controlling the driving timing of the subpixels SP.

The gate driving circuit 120 can include one or more gate driver integrated circuits GDIC. Depending on driving schemes, the gate driving circuit 120 can be positioned on only one side, or each of two opposite sides, of the display panel 110.

Each gate driver integrated circuit GDIC can be connected to a bonding pad of the display panel 110 in a tape automated bonding (TAB) manner or a chip on glass (COG) manner. Alternatively, each gate driver integrated circuit GDIC can be implemented in a gate in panel (GIP) type and directly disposed on the display panel 110. Alternatively, each gate driver integrated circuit GDIC can be integrated and disposed on the display panel 110. Alternatively, each gate driver integrated circuit GDIC can be implemented in a chip on film (COF) manner to be mounted on a film connected to the display panel 110.

The data driving circuit 130 can receive image data DATA from the timing controller 140 and convert the image data DATA into an analog data voltage. The data driving circuit 130 can output the data voltage to the data line DL according to the timing at which the scan signal is applied through the gate line GL. Accordingly, each subpixel SP can represent the brightness according to the image data DATA.

The data driving circuit 130 can include one or more source driver integrated circuits SDIC.

Each source driver integrated circuit SDIC can include a shift register, a latch circuit, a digital-to-analog converter, an output buffer, and the like.

Each source driver integrated circuit SDIC can be connected to a bonding pad of the display panel 110 in a tape automated bonding (TAB) manner or a chip on glass (COG) manner. Alternatively, each source driver integrated circuit SDIC can be directly disposed on the display panel 110. Alternatively, each source driver integrated circuit SDIC can be integrated and disposed on the display panel 110. Alternatively, each source driver integrated circuit SDIC can be implemented by a chip on film (COF) method. In this situation, each source driver integrated circuit SDIC can be mounted on a film connected to the display panel 110 and can be electrically connected to the display panel 110 through lines on the film.

The controller 140 can supply various control signals to the gate driving circuit 120 and the data driving circuit 130 and control the operation of the gate driving circuit 120 and the data driving circuit 130.

The controller 140 can be mounted on a printed circuit board or a flexible printed circuit and can be electrically connected with the gate driving circuit 120 and the data driving circuit 130 through the printed circuit board or the flexible printed circuit.

The controller 140 can enable the gate driving circuit 120 to output scan signals according to the timing set in each frame, convert image data received from the outside to meet the data signal format used by the data driving circuit 130, and output the resultant image data DATA to the data driving circuit 130.

The controller 140 can receive, from the outside (e.g., host system), various timing signals including a vertical synchronization signal VSYNC, a horizontal synchronization signal HSYNC, an input data enable signal DE, and a clock signal CLK, together with the image data.

The controller 140 can generate a diversity of control signals using the timing signals received from the outside and output the control signals to the gate driving circuit 120 and the data driving circuit 130.

As an example, to control the gate driving circuit 120, the controller 140 can output various gate control signals GCS including a gate start pulse GSP, a gate shift clock GSC, and a gate output enable signal GOE.

The gate start pulse GSP can control the operation start timing of one or more gate driver integrated circuits GDICs constituting the gate driving circuit 120. The gate shift clock GSC is a clock signal commonly input to one or more gate driver integrated circuits GDICs and can control the shift timing of the scan signals. The gate output enable signal GOE can designate timing information about one or more gate driver integrated circuits GDICs.

Further, to control the data driving circuit 130, the controller 140 can output various data control signals DCS including, e.g., a source start pulse SSP, a source sampling clock SSC, and a source output enable signal SOE.

The source start pulse SSP can control the data sampling start timing of one or more source driver integrated circuits SDICs constituting the data driving circuit 130. The source sampling clock SSC is a clock signal for controlling the sampling timing of data in each source driver integrated circuit (SDIC). The source output enable signal SOE can control the output timing of the data driving circuit 130.

The touch display device 100 can further include a power management integrated circuit that supplies various voltages or currents to the display panel 110, the gate driving circuit 120, and the data driving circuit 130 or controls various voltages or currents to be supplied.

A configuration for touch sensing in the touch display device 100 is described below. The touch driving circuit 200 can drive a plurality of touch electrodes TE disposed on the display panel 110. The touch driving circuit 200 can supply a touch driving signal to the touch electrode TE through the touch line TL and can receive a touch sensing signal from the touch electrode TE.

The touch electrode TE can be positioned outside the display panel 110 or can be positioned inside or embedded within the display panel 110.

When the touch electrode TE is positioned inside the display panel 110, the touch electrode TE can be an electrode disposed separately from an electrode for display driving. Alternatively, the touch electrode TE can be one of the electrodes for display driving. For example, the touch electrode TE can include one of pixel electrodes or part of a common electrode used for displaying images.

For example, the touch electrode TE can be an electrode split from the common electrode (or cathode electrode) for display driving. In this situation, the touch electrode TE can function as an electrode for touch sensing and an electrode for display driving (e.g., dual functions).

For example, the touch electrode TE can be driven as a common electrode and a touch electrode TE in temporally split periods (e.g., a display driving period and a touch sensing period).

In this situation, touch driving signals can be supplied to the touch electrodes TE through the touch lines TL during the period when touch sensing is performed. In a period distinct from the period during which touch sensing is performed, a voltage for display driving can be supplied to the touch electrode TE to perform display driving.

Alternatively, the touch electrode TE can simultaneously function as a touch electrode TE and a common electrode at the same time. In this situation, since the touch driving signal is applied to the touch electrode TE during the display driving period while an image is being displayed, the signal for display driving (e.g., a data voltage or a scan signal) can be supplied in a form modulated based on the touch driving signal. For example, the touch driving signal can be modulated on top of the data voltage signal or the scan signal.

As described above, the touch driving circuit 200 can perform touch sensing by supplying the touch driving signal to the touch electrode TE during a display driving period or a period temporally divided from the display driving period.

The touch driving circuit 200 can convert the touch sensing signal into digital touch sensing data and transmit the converted touch sensing data to the touch controller. The touch controller can detect the presence of a touch and the coordinates of the touch based on the touch sensing data.

Since the magnitude of the touch sensing signal can be small, the touch driving circuit 200 can integrate the touch sensing signal multiple times before converting the touch sensing signal into touch sensing data and output the integrated touch sensing signal.

Figure 2:
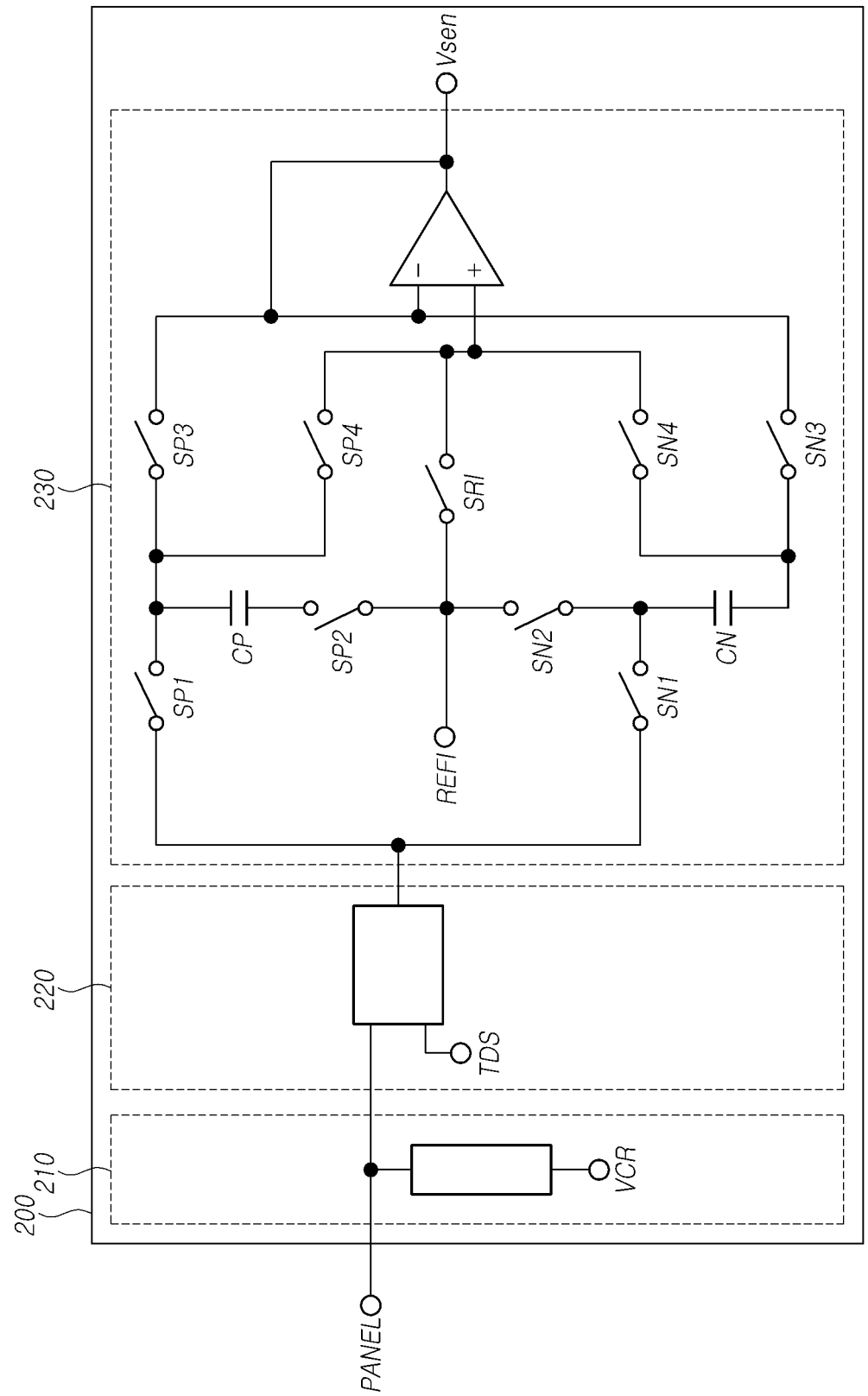
FIG. 2 is a view illustrating an example configuration of a touch driving circuit included in a touch display device according to embodiments of the disclosure.

FIG. 2 is a view illustrating an example configuration of a touch driving circuit 200 included in a touch display device 100 according to embodiments of the disclosure.

Referring to FIG. 2, a touch driving circuit 200 can include a first charge regulator 210, a current regulator 220, and a converting integrator 230.

The first charge regulator 210 can be electrically connected via the touch line TL to the touch electrode TE disposed on the display panel 110. The first charge regulator 210 can adjust the charge amount of the input current received via the touch line TL.

For example, the first charge regulator 210 can adjust the charge amount of the input current based on the capacitance.

The first charge regulator 210 can receive a charge regulating voltage VCR and can include at least one switch and at least one capacitor. The first charge regulator 210 can adjust the charge amount of the input current received via the touch line TL based on the level of the charge regulating voltage VCR and the operation of the switch to remove noise from the input current or to adjust the input current to a level that is more suitable for sensing touch.

After the charge amount of the input current has been adjusted by the first charge regulator 210, the adjusted input current can be input to the current regulator 220.

The current regulator 220 can receive the adjusted input current and a touch driving signal TDS received via the touch line TL. The current regulator 220 can output a first current by adjusting the magnitude of the input current received via the touch line TL, and the first current can be input, as a sensing current, to the converting integrator 230. The first current can also be referred to as a calibration current.

The converting integrator 230 can receive the sensing current whose magnitude has been adjusted by the current regulator 220.

The converting integrator 230 can convert the sensed current to a voltage and integrate sensed current over a period of time. The converting integrator 230 can convert the sensing current into a voltage and output the integrated sensing voltage Vsen to an analog-to-digital converter. Touch sensing data in digital form converted by the analog-to-digital converter can be transmitted to the touch controller.

The converting integrator 230 can include, e.g., a plurality of integration switches SP1, SP2, SP3, SP4, SN1, SN2, SN3, and SN4, an integrating reset switch SRI, and integration capacitors CP and CN, and can include an amplifier. An example structure and driving scheme of the converting integrator 230 is described below in detail with reference to FIGS. 5 to 7.

The touch driving circuit 200, according to embodiments of the present disclosure, can provide a sensing voltage Vsen via a current-based integration by adjusting the magnitude of the input current received via the touch line TL by the current regulator 220 and then integrating the adjusted input current over a period of time using the converting integrator 230.

The structure of the current regulator 220 included in the touch driving circuit 200 can be implemented in various ways.

Figure 3:
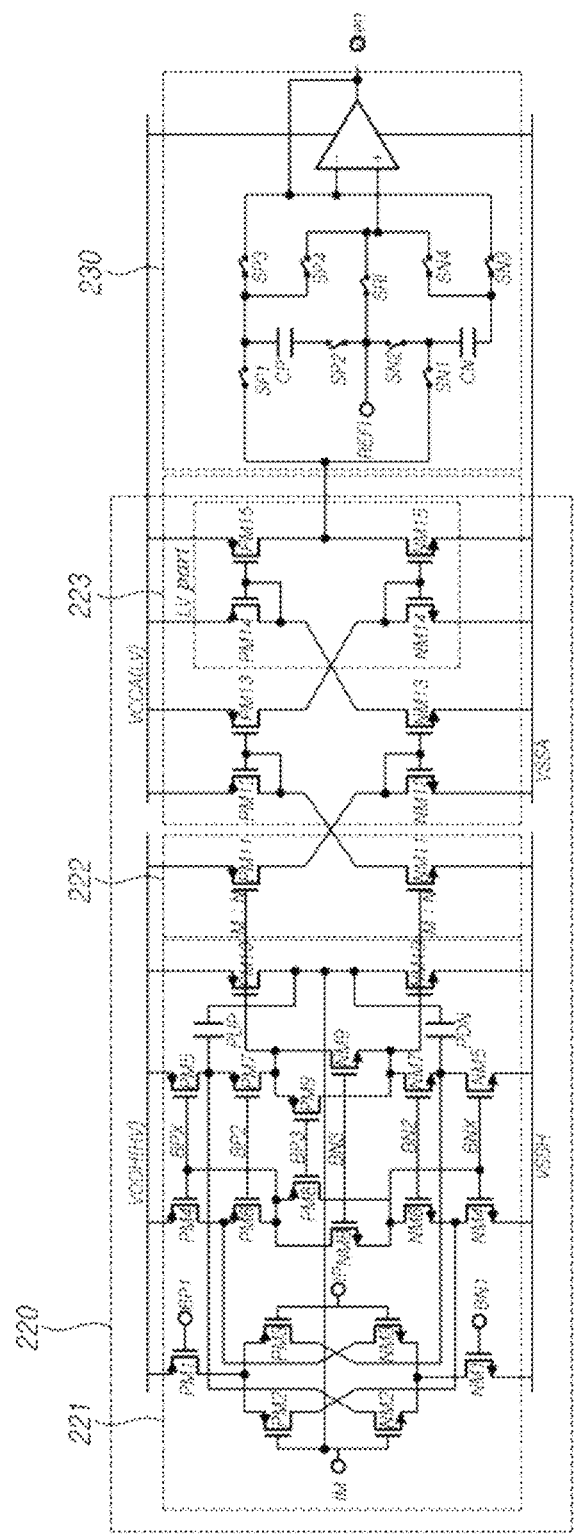
FIGS. 3 and 4 are views illustrating an example structure of a current regulator included in a touch driving circuit according to embodiments of the disclosure.
Figure 4:
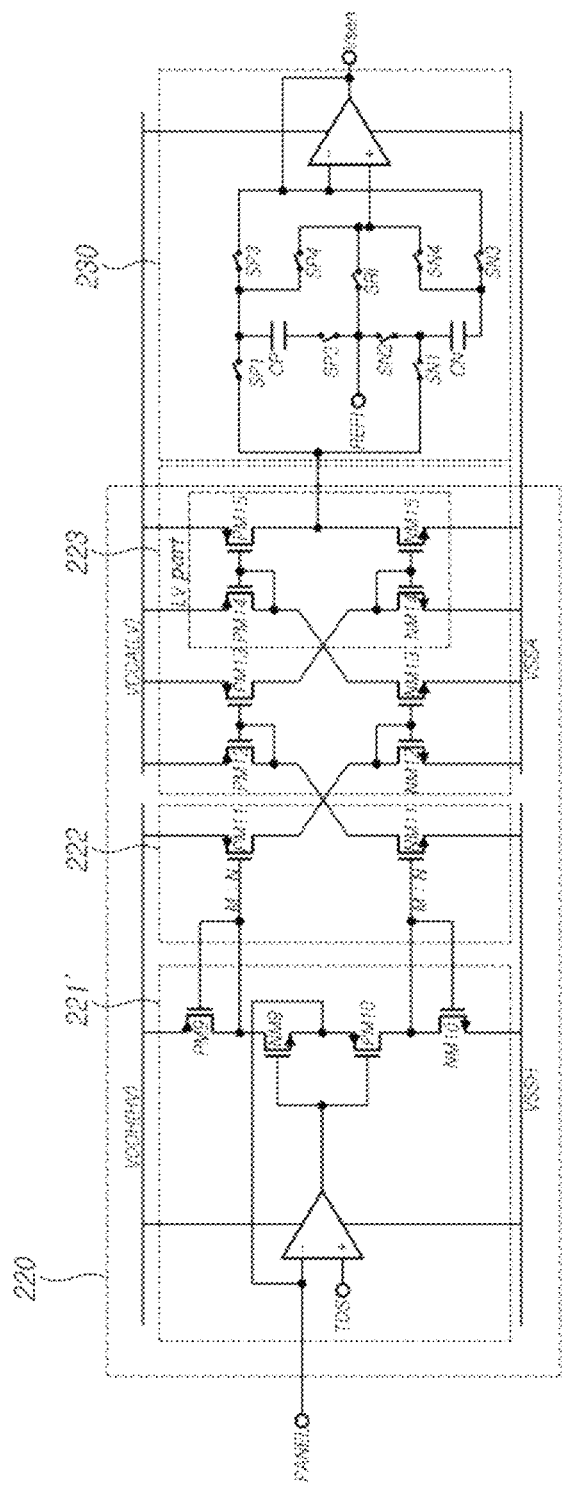

FIGS. 3 and 4 are views illustrating an example structure of a current regulator 220 included in a touch driving circuit 200 according to embodiments of the disclosure.

FIG. 3 illustrates an example structure of a current regulator 220 and a converting integrator 230 included in the touch driving circuit 200.

The current regulator 220 can include, e.g., an operational amplifier 221, a current scaler 222, and a power domain shifter 223.

The operational amplifier 221 can include, e.g., a plurality of transistors and at least one capacitor.

The operational amplifier 221 can be electrically connected to an IM terminal to which the input current received through the touch line TL is input. The operational amplifier 221 can be electrically connected to an IP terminal to which the touch driving signal TDS is input.

The operational amplifier 221 can receive a high-potential voltage VDDH and a low-potential voltage VSSH. Circuit elements included in the operational amplifier 221 can be, e.g., circuit elements operating in the high voltage range HV. The high-potential voltage VDDH supplied to the operational amplifier 221 can be a voltage in the high voltage range HV.

The operational amplifier 221 can receive the high-potential voltage VDDH and the low-potential voltage VSSH and control sourcing and sinking of current by a plurality of transistors.

The operational amplifier 221 can include a plurality of transistors PM1, PM2, . . . . PM10 that control the sourcing of current and a plurality of transistors NM1, NM2, . . . , NM10 that control the sinking of current. Constant sourcing and sinking of current can be controlled by applying one of fixed voltages BP1, BP2, BP3, BPX, BN1, BN2, BN3, and BNX to the gate terminals of some PM1, PM4 to PM9, NM1, NM4 to NM9 of the plurality of transistors PM1, . . . , PM10, NM1, . . . , NM10. The input current input to the IM terminal can be applied to the gate terminals of the transistors PM2 and NM2. The touch driving signal TDS input to the IP terminal can be applied to gate terminals of the transistors PM3 and NM3.

The current scaler 222 can adjust the magnitude of the current flowing through the operational amplifier 221.

The current scaler 222 can include, e.g., two transistors PM11 and NM11. The gate terminal of the transistor PM11 included in the current scaler 222 can be controlled by the same voltage PUP as the gate terminal of the transistor PM10 included in the operational amplifier 221. The gate terminal of the transistor NM11 included in the current scaler 222 can be controlled by the same voltage PDN as the gate terminal of the transistor NM10 included in the operational amplifier 221.

The ratio of the current flowing through the transistor PM10 and the current flowing through the transistor PM11 can be M:N. The ratio of the current flowing through the transistor NM10 and the current flowing through the transistor NM11 can be M:N. N can be smaller than M. M:N can mean the ratio of the respective channels of the transistors. The channel ratio can mean, e.g., the ratio of the channel width of the transistors PM10 and NM10 to the channel width of the transistors PM11 and NM11. Or, the channel ratio can refer to the ratio of the width/length of the channel of the transistors PM10 and NM10 to the width/length of the channel of the transistors PM11 and NM11. The ratio of the channels can also refer to a ratio for one of the channel characteristics that affect the ratio of the current flowing in the transistors PM10 and NM10 included in the operational amplifier 221 to the current flowing in the transistors PM11 and NM11 included in the current scaler 222 according to the same voltage applied to the gate terminals. The magnitude of the current controlled by the current scaler 222 can be controlled through the control of the M:N ratio.

The current flowing through the operational amplifier 221 can be adjusted in magnitude by the transistors PM10, PM11, NM10, and NM11 having gate terminals controlled by the same voltage, and be provided to the power domain shifter 223.

The power domain shifter 223 can include a plurality of transistors PM12, PM13, PM14, and PM15 that control the sourcing of current and a plurality of transistors NM12, NM13, NM14, and NM15 that control the sinking of current.

The power domain shifter 223 can receive a high-potential voltage VCCA and a low-potential voltage VSSA. The high-potential voltage VCCA can be a voltage in the low voltage range LV. Further, the transistors PM14, PM15, NM14, and NM15 included in the power domain shifter 223 can be circuit elements operating in the low voltage range LV.

The current of the high voltage range HV can be converted into a current of the low voltage range LV by the power domain shifter 223 and the current converted to the low voltage range LV can be provided to the converting integrator 230.

The converting integrator 230, which includes circuit elements of the low voltage range LV, can be prevented from failing to normally work by being supplied with a current in the high voltage range HV In other words, the converting integrator 230 can be supplied with current in the low voltage range LV, in order to maintain good operation of the converting integrator 230, so that failures or abnormal conditions that could be caused by current in the high voltage range HV can be prevented or avoided. For example, current in the high voltage range HV may degrade the lifespan of the converting integrator 230 or cause elements within the converting integrator 230 to fail prematurely.

As such, the current in the low voltage range LV, which has been adjusted in input current magnitude by the current regulator 220 composed of the operational amplifier 221, the current scaler 222, and the power domain shifter 223, can be provided to the converting integrator 230. By supplying the low voltage current to the converting integrator 230, normal operation can be ensured, and the lifespan can be extended, as well as reducing power consumption.

The circuit structure included in the current regulator 220 can be implemented in various ways. For example, as in the example shown in FIG. 4, a current conveyor 221' can be provided instead of the operational amplifier 221.

The input current received through the touch line TL can be provided by the current conveyor 221'. The transistors PM11 and NM11 included in the current scaler 222 can be disposed to have a current ratio of M:N to the transistors PM9 and NM9 included in the current conveyor 221'.

The current scaled by the current conveyor 221' and the current scaler 222 can be provided to the converting integrator 230 via the power domain shifter 223.

In addition to the above-described example, the circuit structure for transferring the input current received through the touch line TL to the current scaler 222 can be implemented in various ways.

The converting integrator 230 can integrate the sensing current transferred through the current scaler 222 and the power domain shifter 223 and output the sensing voltage Vsen.

Figure 5:
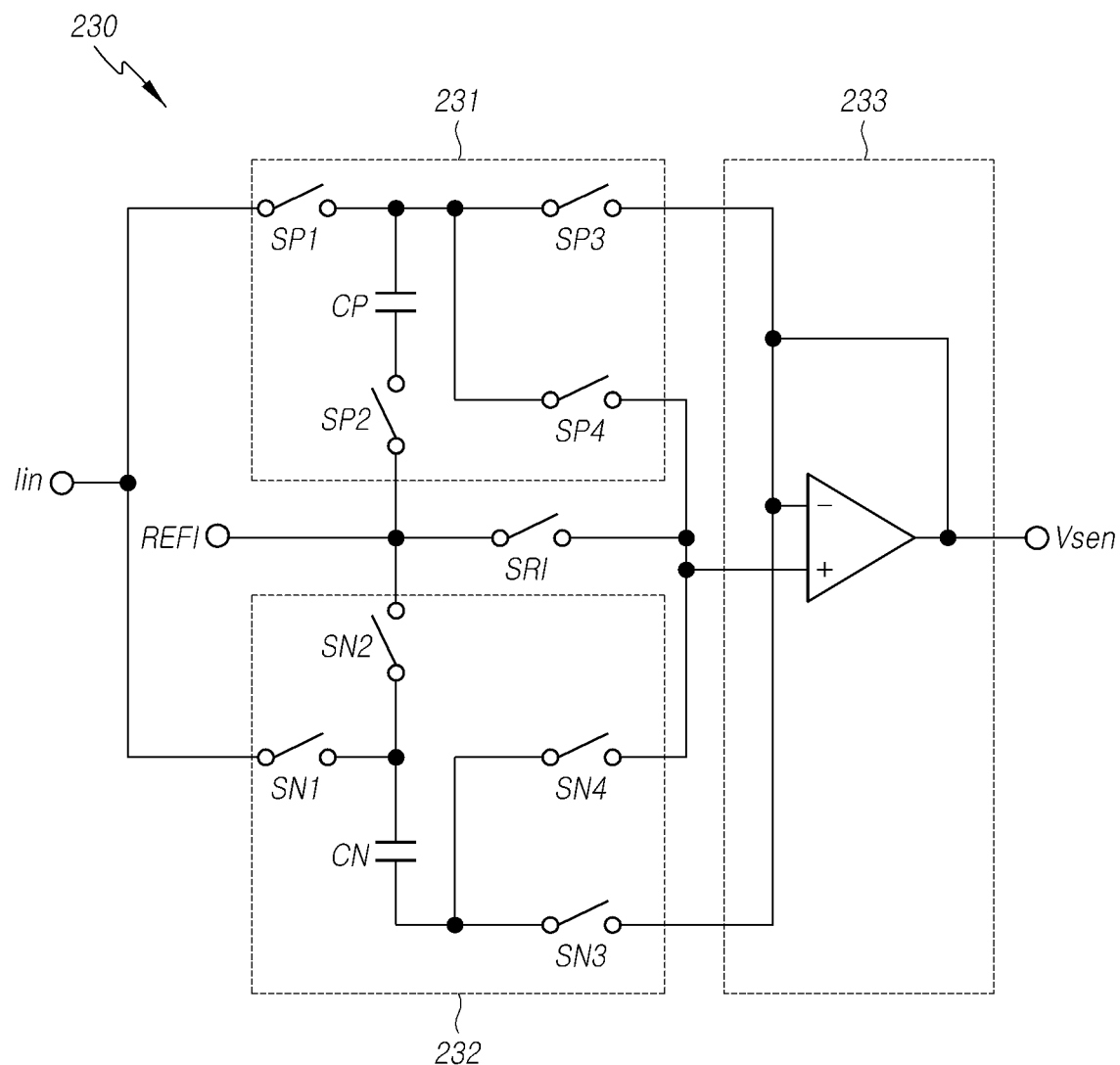
FIG. 5 is a view illustrating an example structure of a converting integrator included in a touch driving circuit according to embodiments of the disclosure.
Figure 6:
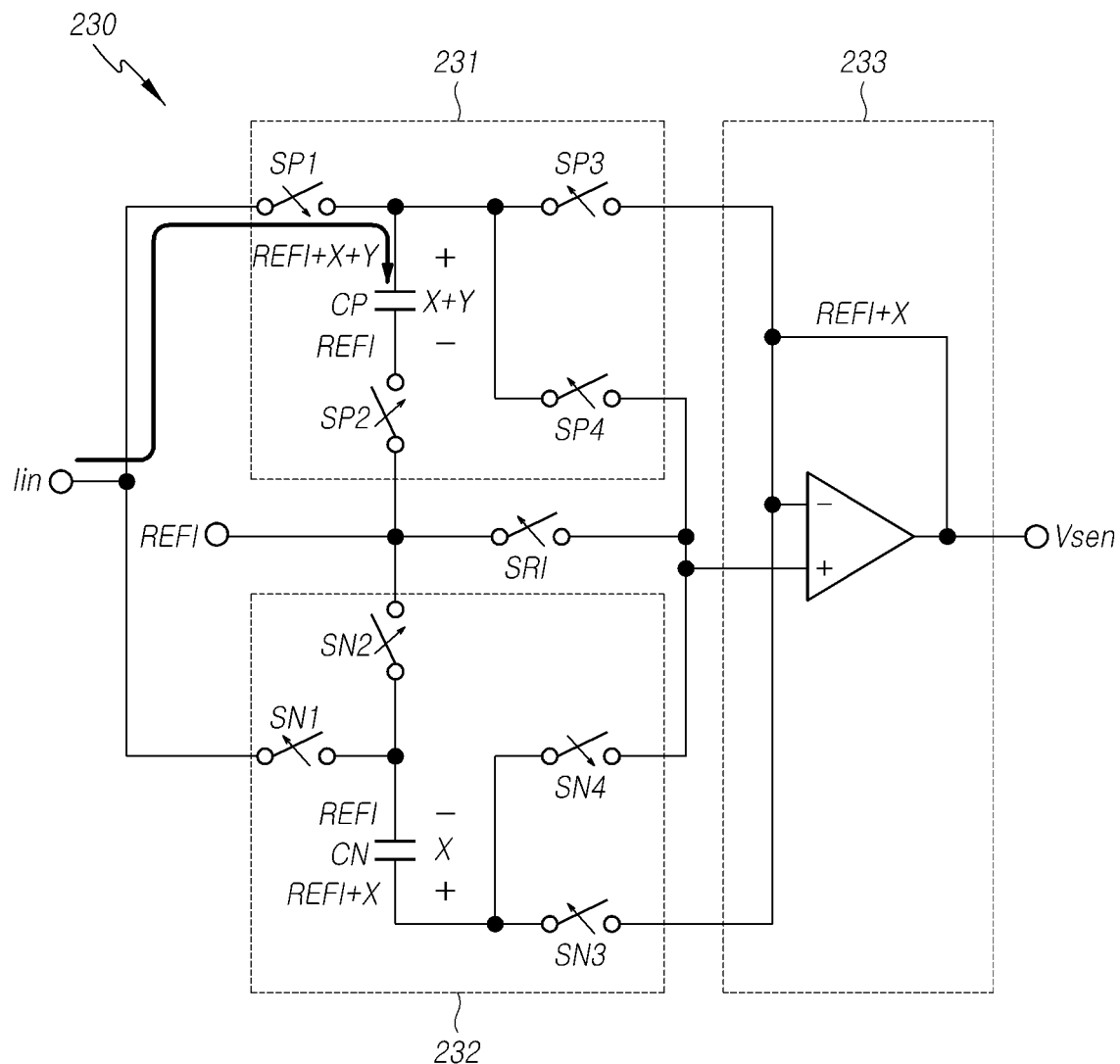
FIGS. 6 and 7 are views illustrating an example driving scheme of the converting integrator of FIG. 5 according to embodiments of the disclosure.
Figure 7:
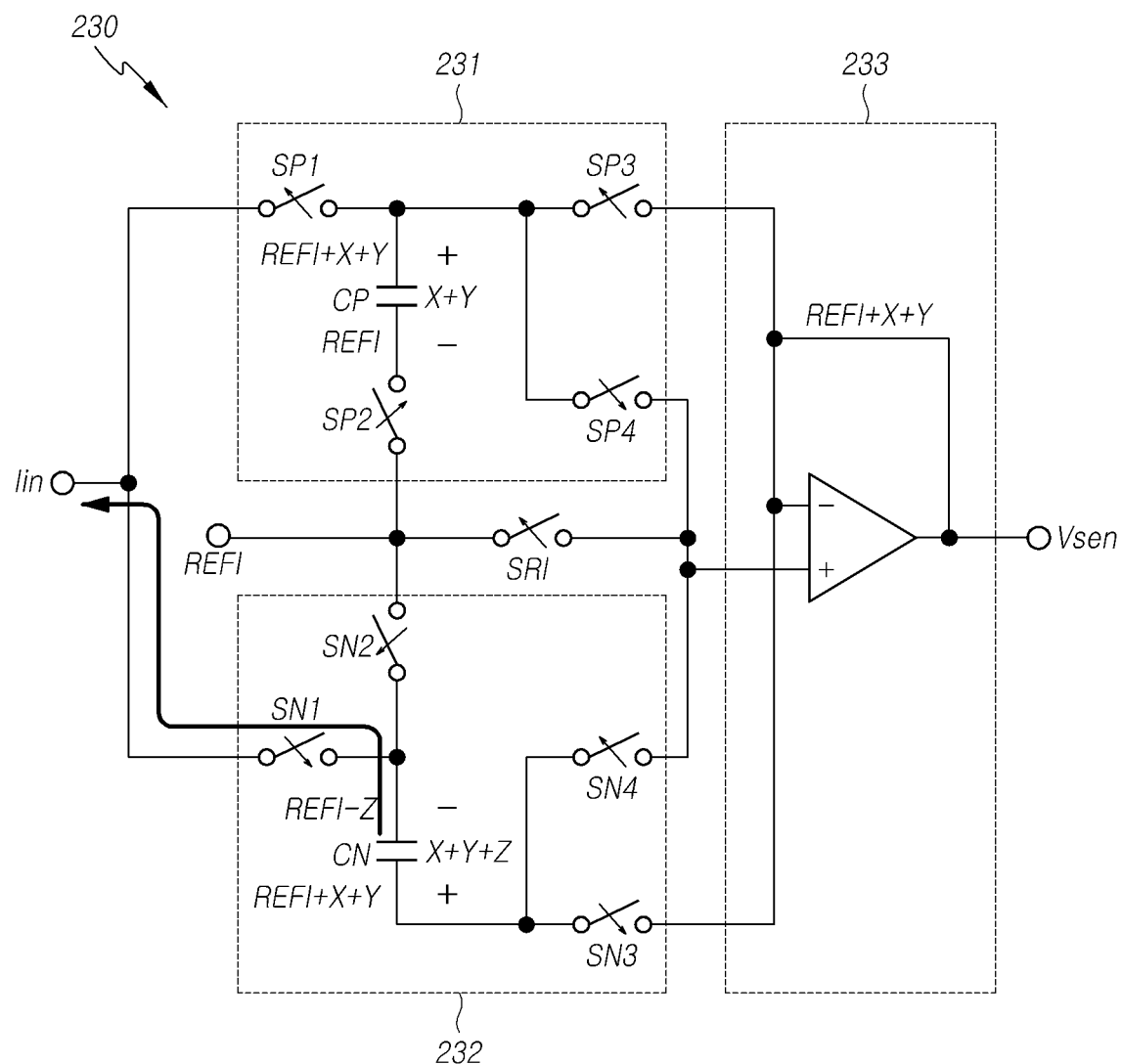
Figure 8:
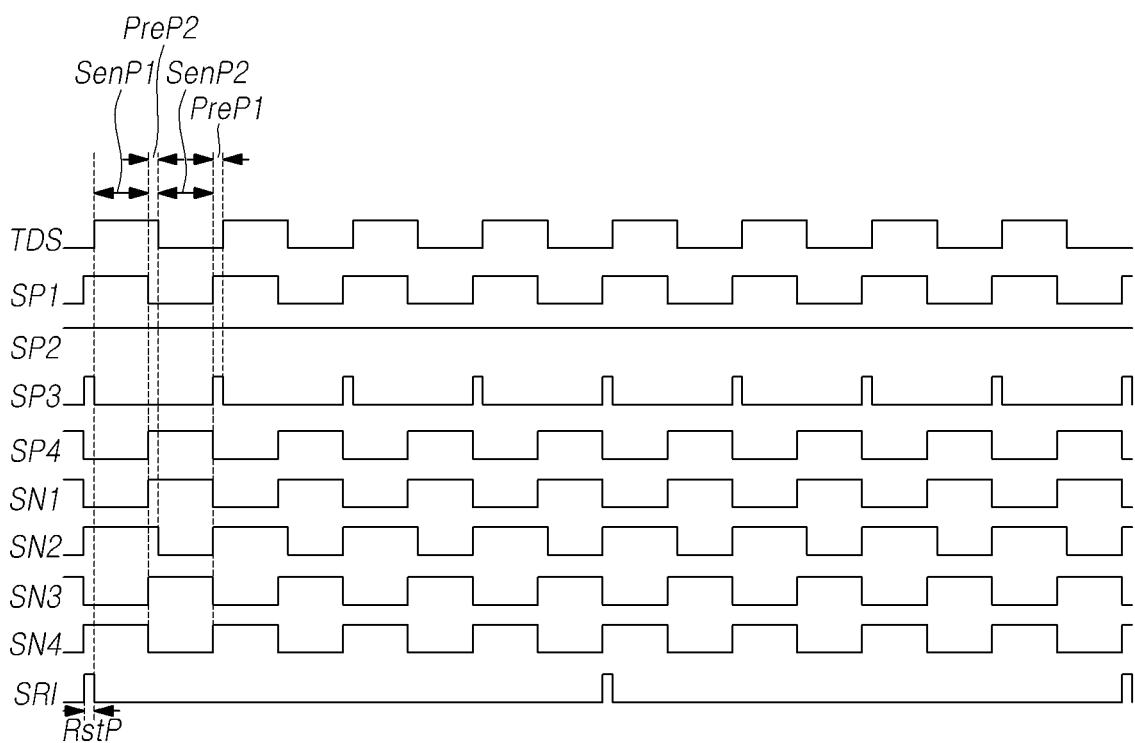
FIG. 8 is a view illustrating an example driving timing of the converting integrator of FIG. 5 according to embodiments of the disclosure.

FIG. 5 is a view illustrating an example structure of a converting integrator 230 included in a touch driving circuit 200 according to embodiments of the disclosure. FIGS. 6 and 7 are views illustrating an example driving scheme of the converting integrator 230 of FIG. 5. FIG. 8 is a view illustrating an example driving timing of the converting integrator 230 of FIG. 5.

Referring to FIG. 5, a converting integrator 230 can include a first integration block 231, a second integration block 232, and a gain buffer 233.

The first integration block 231 can be a block that integrates the sensing current Iin according to the touch driving signal TDS having a first level (e.g., high level) and a second level (e.g., low level), in the period of the first level. The sensing current Iin can be a first current which has been adjusted in magnitude and output by the current regulator 220.

The second integration block 232 can be a block that integrates the sensing current Iin in the period of the second level of the touch driving signal TDS. The gain buffer 233 can output a sensing voltage Vsen according to integration by the first integration block 231 and the second integration block 232.

The first integration block 231 can include, e.g., a first positive integration switch SP1, a second positive integration switch SP2, a third positive integration switch SP3, a fourth positive integration switch SP4, and a positive integration capacitor CP. The second integration block 232 can include, e.g., a first negative integration switch SN1, a second negative integration switch SN2, a third negative integration switch SN3, a fourth negative integration switch SN4, and a negative integration capacitor CN.

In the first integration block 231, the first positive integration switch SP1 can be electrically connected to the input end of the sensing current Iin. The first positive integration switch SP1 can be electrically connected to a node between the third positive integration switch SP3, the fourth positive integration switch SP4, and the positive integration capacitor CP.

The second positive integration switch SP2 can be electrically connected between the input end of an integration reference voltage REFI and the positive integration capacitor CP.

In the second integration block 232, the first negative integration switch SN1 can be electrically connected to the input end of the sensing current Iin. The first negative integration switch SN1 can be electrically connected to a node between the second negative integration switch SN2 and the negative integration capacitor CN.

The second negative integration switch SN2 can be electrically connected to the input end of the integration reference voltage REFI. The third negative integration switch SN3 and the fourth negative integration switch SN4 can be electrically connected between the negative integration capacitor CN and the gain buffer 233.

An integration reset switch SRI can be electrically connected between the input end of the integration reference voltage REFI and the gain buffer 233. The integration reset switch SRI can be electrically connected to a node between the second positive integration switch SP2 and the second negative integration switch SN2.

The first integration block 231 and the second integration block 232 can integrate the sensing current Iin in the first level period and the second level period, respectively, of the touch driving signal TDS.

FIG. 6 illustrates an example scheme in which the first integration block 231 converts the sensing current Iin into a voltage and integrates it. FIG. 6 illustrates an example where the amount of charge X is accumulated in the negative integration capacitor CN of the second integration block 232 in the previous integration process.

Referring to FIGS. 6 and 8, the period in which the level of the touch driving signal TDS is the first level (e.g., high level) can include a first sensing period SenP1 and a second preset period PreP2.

During the first sensing period SenP1, the first positive integration switch SP1 and the second positive integration switch SP2 of the first integration block 231 can be turned on (e.g., closed). The third positive integration switch SP3 and the fourth positive integration switch SP4 can be turned off (e.g., opened).

During the first sensing period SenP1, the second negative integration switch SN2 and the fourth negative integration switch SN4 of the second integration block 232 can be turned on, and the first negative integration switch SN1 and the third negative integration switch SN3 can be turned off.

In the period where the touch driving signal TDS is at the first level, since the first positive integration switch SP1 is turned on, charges can be accumulated in the positive integration capacitor CP by the sensing current Iin. Charges corresponding to Y can be accumulated in the positive integration capacitor CP.

Since the second positive integration switch SP2 is in the turned on state, the voltage at one end of the positive integration capacitor CP becomes a integration reference voltage REFI, and the voltage at the other end of the positive integration capacitor CP becomes an integration reference voltage (REFI)+X+Y The amount of charge accumulated in the positive integration capacitor CP can be X+Y.

In the second preset period PreP2, the first positive integration switch SP1 can be turned off (e.g., opened), and the fourth positive integration switch SP4 can be turned on (e.g., closed). Further, the third negative integration switch SN3 of the second integration block 232 can be turned on. The integration reference voltage (REFI)+X+Y, which is the voltage across the positive integration capacitor CP, can become the voltage at one end of the negative integration capacitor CN through the fourth positive integration switch SP4, the (+) and (−) inputs of the gain buffer 233, and the third negative integration switch SN3. A charge amount corresponding to X+Y can be accumulated in the negative integration capacitor CN.

Integration can be performed by the second integration block 232 in a period where the level of the touch driving signal TDS is the second level (e.g., low level).

Referring to FIGS. 7 and 8, the period in which the level of the touch driving signal TDS is the second level can include a second sensing period SenP2 and a first preset period PreP1.

During the second sensing period SenP2, the first negative integration switch SN1 and the third negative integration switch SN3 of the second integration block 232 can be turned on (e.g., closed). The second negative integration switch Sn2 and the fourth negative integration switch SN4 can be turned off (e.g., opened).

During the second sensing period SenP2, the second positive integration switch SP2 and the fourth positive integration switch SP4 of the first integration block 231 can be turned on, and the first positive integration switch SP1 and the third positive integration switch SP3 can be turned off.

Since the first negative integration switch SN1 is turned on and the second level touch driving signal TDS is applied, current can be sunk through the input end of the sensing current Iin. When a current corresponding to the charge amount Z is sunk, since the second negative integration switch SN2 is in the turned-off state, the voltage at the node between the negative integration capacitor CN and the first negative integration switch SN1 can be the integration reference voltage (REFI)-Z.

Since the voltage at the node between the negative integration capacitor CN and the third negative integration switch SN3 is the integration reference voltage (REFI)+X+Y due to the integration by the first integration block 231, the amount of charge accumulated in the negative integration capacitor CN can be X+Y+Z, which is the difference between the voltages at both ends.

The integration by the first integration block 231 and the integration by the second integration block 232 can be performed in a plurality of periods in which the level of the touch driving signal TDS is changed between the first level and the second level, and the number of periods in which the integration is performed can be controlled by the operation timing of the integration reset switch SRI. For example, integration can be performed by both integrations blocks while the touch driving signal TDS transitions back and forth between a high level and a low level (e.g., see FIG. 8).

As an example, as illustrated in FIG. 8, integration can be performed during the period where the touch driving signal TDS is at the first level four times and at the second level four times and, during the integration reset period RstP, the integration reset switch SRI can be turned on, and the first integration block 231 and the second integration block 232 can be reset. For example, the converting integrator 230 can continue to perform integration for four periods until the signal corresponding to the integration reset period RstP is received, but embodiments are not limited there do and the integration time can be variously changed according different configurations.

As such, the first integration block 231 and the second integration block 232 each perform the operation of integrating the voltage according to the sensing current Iin in the first level period and the second level period of the touch driving signal TDS, and the sensing voltage Vsen can be output by the gain buffer 233.

Further, the touch driving circuit 200 according to embodiments of the disclosure may not include some components according to circuit elements included in the touch driving circuit 200 or can further include additional components.

Figure 9:
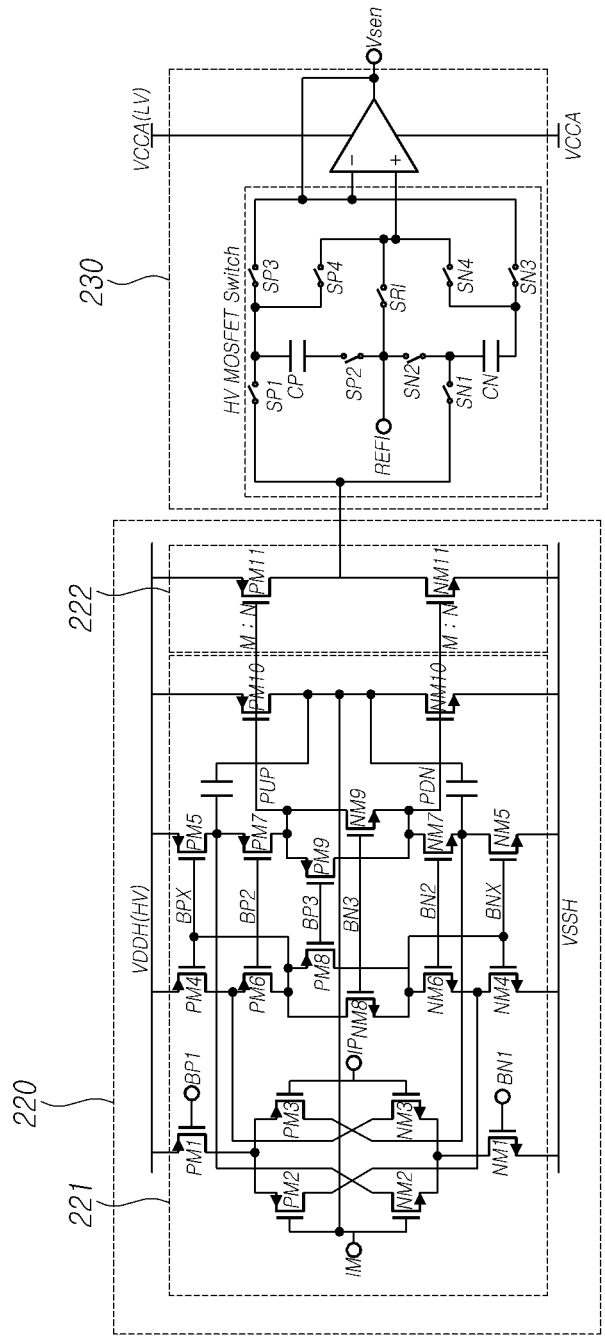
FIG. 9 is a view illustrating another example structure of a touch driving circuit according to embodiments of the disclosure.
Figure 10:
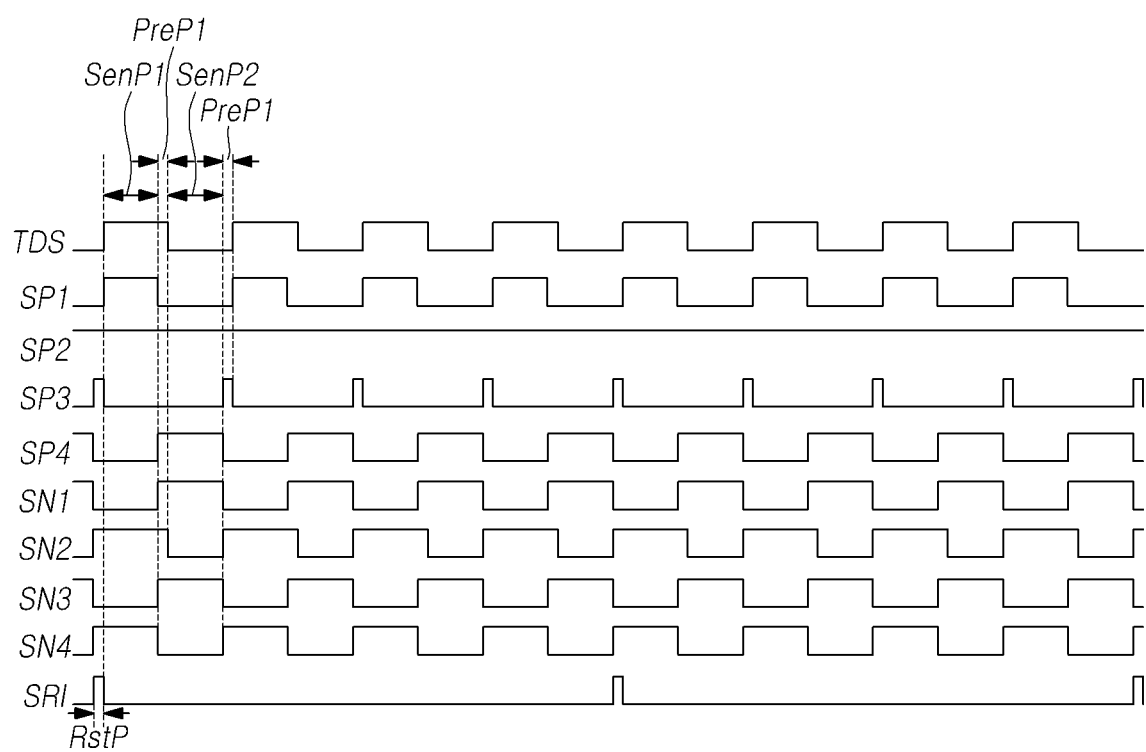
FIG. 10 is a view illustrating an example driving timing of a converting integrator included in the touch driving circuit of FIG. 9 according to embodiments of the disclosure.

FIG. 9 is a view illustrating another example structure of a touch driving circuit 200 according to embodiments of the disclosure. FIG. 10 is a view illustrating an example driving timing of a converting integrator 230 included in the touch driving circuit 200 of FIG. 9.

FIG. 9 illustrates an example structure of a current regulator 220 and a converting integrator 230 included in the touch driving circuit 200.

The current regulator 220 can include an operational amplifier 221 and a current scaler 222. The circuit structure of the current regulator 220 can be the same as the structure described above in connection with FIG. 3.

The converting integrator 230 can include a plurality of integration switches SP1, . . . . SP4 and SN1, . . . . , SN4 and integration capacitors CP and CN. The circuit structure of the converting integrator 230 can be the same as the structure described above in connection with FIG. 5.

The plurality of integration switches SP1, . . . , SP4 and SN1, . . . , SN4 included in the first integration block 231 and the second integration block 232 of the converting integrator 230 can be composed of elements that operate in the high voltage range HV.

Since the switches included in the converting integrator 230 are composed of elements operating in the high voltage range HV, the power domain shifter 223 may not be placed between the current scaler 222 of the current regulator 220 and the converting integrator 230 (e.g., the power domain shifter 223 can be omitted).

The switches included in the first integration block 231 and the second integration block 232 of the converting integrator 230 can be configured as switches operating in the high voltage range HV, and the elements included in the gain buffer 233 can be configured as switches operating in the low voltage range LV.

Accordingly, operation timings of some of the integration switches can be adjusted so that the current in the high voltage range HV does not affect the elements operating in the low voltage range LV of the gain buffer 233.

Referring to FIG. 10, operating timings of the integration switches other than the first positive integration switch SP1 can be the same as those described above with reference to FIG. 8.

The first positive integration switch SP1 can be in a turned-on state (e.g., closed) in the first sensing period SenP1 and can be in a turn-off state (e.g., opened) in the first preset period PreP1. The period when the first positive integration switch SP1 is turned on may not overlap the period when the third positive integration switch SP3 is turned on. Accordingly, the length of the period when the first positive integration switch SP1 is turned on can be shorter than the length of the period when the first negative integration switch SN1 is turned on.

The period when the first positive integration switch SP1 is turned on does not overlap the period when the third positive integration switch SP3 is turned on, so that the first positive integration switch SP1 and the third positive integration switch SP3 may not be simultaneously turned on at the same time. It is possible to prevent the current in the high voltage range HV from affecting the gain buffer composed of the elements of the low voltage range LV due to simultaneous turn-on of the first positive integration switch SP1 and the third positive integration switch SP3. For example, in this way, low voltage elements in the gain buffer can be isolated and protected from high voltage operations that occur in the current scaler 222 or the operational amplifier 221.

A component that adjusts the amount of charge based on current in the circuit structure that provides the sensing voltage Vsen through current-based scaling and integration can further be included.

Figure 11:
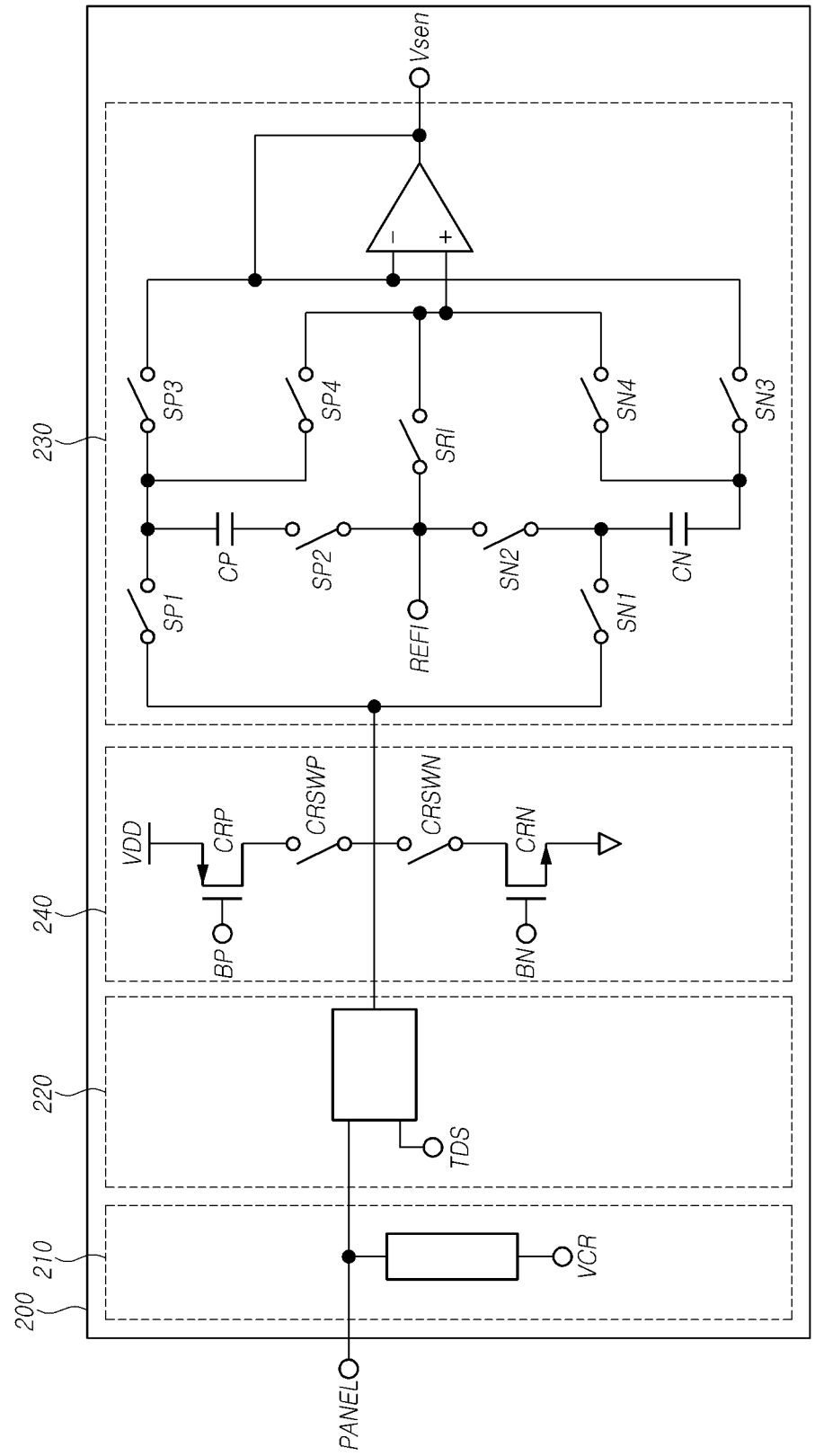
FIG. 11 is a view illustrating another example configuration of a touch driving circuit included in a touch display device according to embodiments of the disclosure.
Figure 12:
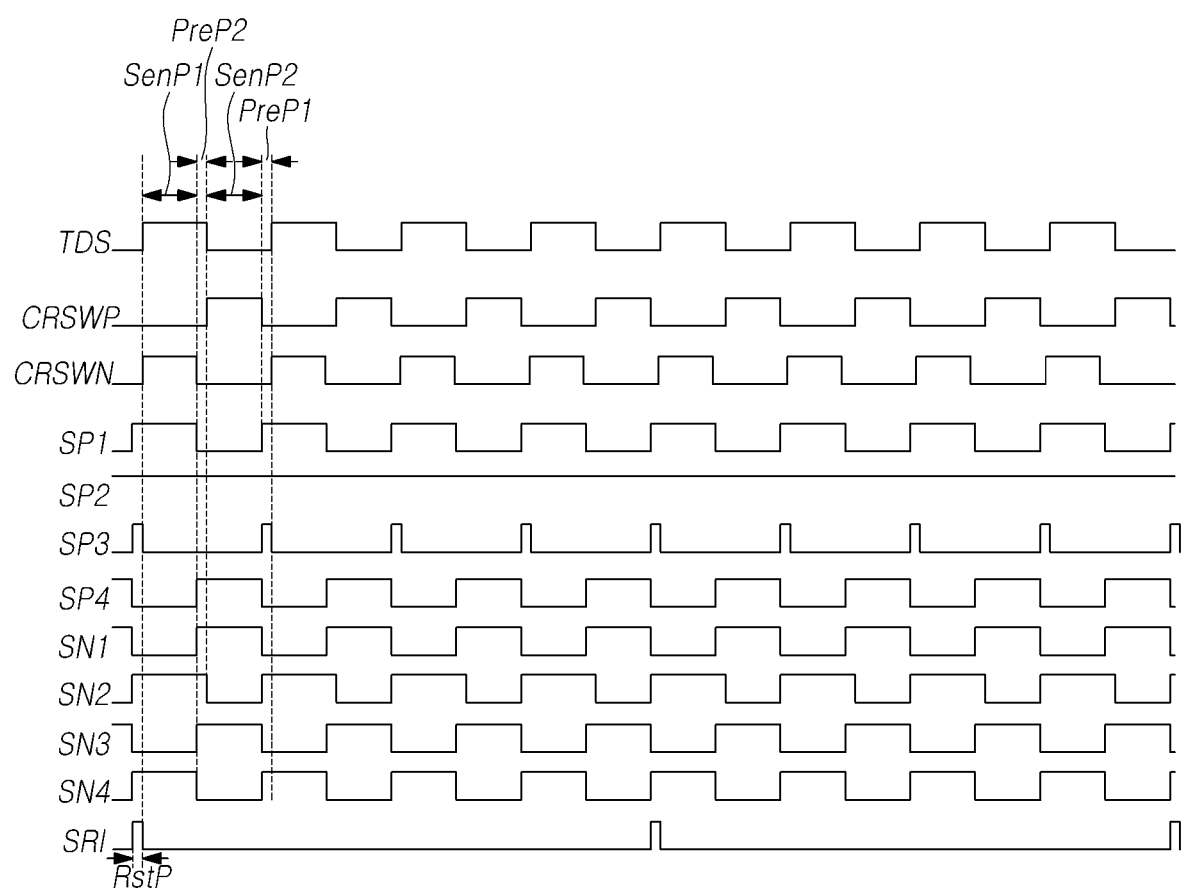
FIG. 12 is a view illustrating an example driving timing of the touch driving circuit of FIG. 11 according to embodiments of the disclosure.

FIG. 11 is a view illustrating another example configuration of a touch driving circuit 200 included in a touch display device 100 according to embodiments of the disclosure. FIG. 12 is a view illustrating an example driving timing of the touch driving circuit 200 of FIG. 11.

Referring to FIG. 11, a touch driving circuit 200 can include a first charge regulator 210, a current regulator 220, a second charge regulator 240, and a converting integrator 230.

The first charge regulator 210 can be connected to an input end of the current regulator 220 and can adjust the charge amount of the input current received through the touch line TL based on capacitance.

The second charge regulator 240 can be electrically connected between the current regulator 220 and the converting integrator 230. The second charge controller 240 can output a second current by adjusting the charge amount of the first current output by the current regulator 220 based on the current. The second current output by the second charge regulator 240 can be input, as the sensing current Iin, to the converting integrator 230.

The second charge controller 240 can be implemented in various ways and, as an example, can include a current provider, a current remover, a first charge control switch CRSWP and a second charge control switch CRSWN.

The current provider can include, e.g., a transistor CRP having the gate terminal to which a constant voltage BP is applied and can supply a constant current to one end of the first charge control switch CRSWP. According to the operation of the first charge control switch CRSWP, the amount of the second current output through the second charge regulator 240 can increase.

The current remover can include, e.g., a transistor CRN having the gate terminal to which a constant voltage BN is applied and can discharge a constant current from one end of the second charge control switch CRSWN. According to the operation of the second charge control switch CRSWN, the amount of the second current output through the second charge regulator 240 can decrease.

The operating timing of the first charge control switch CRSWP and the operating timing of the second charge control switch CRSWN can be set to vary depending on the amount of current to be controlled by the second charge regulator 240.

For example, the first charge control switch CRSWP can be turned on during the second sensing period SenP2 and turned off during the remaining period. The second charge control switch CRSWN can be turned on during the first sensing period SenP1 and turned off during the remaining period.

The length of the turned-on period of each of the first charge control switch CRSWP and the second charge control switch CRSWN can be smaller than the pulse width of the touch driving signal TDS.

Further, the amount of current adjusted by the second charge regulator 240 can be controlled by adjusting the lengths of the turned-on periods of the first charge control switch CRSWP and the second charge control switch CRSWN.

When the amount of current output by the current regulator 220 is not sufficiently reduced, the magnitude of the sensing current Iin input can be further adjusted to an appropriate magnitude to be received by the converting integrator 230, by adjusting the amount of current by the second charge regulator 240. In this way, the converting integrator 230 can be supplied with sensing current Iin input having an appropriate magnitude that matching the operating specifications of the converting integrator 230, which can increase the lifespan of the converting integrator 230 and reduce unnecessary power consumption. In other words, the current input into the converting integrator 230 can be finely matched and adjusted so that the converting integrator 230 operates at peak performance and optimal conditions.

Embodiments of the disclosure described above are briefly described below.

A touch display device according to embodiments of the disclosure can comprise a plurality of touch electrodes disposed on a display panel and a touch driving circuit driving the plurality of touch electrodes and configured to output a touch driving signal having a first level period and a second level period.

The touch driving circuit can include a current regulator configured to output a first current produced by scaling down an input current received from at least one of the plurality of touch electrodes during at least a partial period of the first level period and the second level period of the touch driving signal; and a converting integrator configured to output a sensing voltage by outputting, at least one time, a voltage according to the first current or a second current adjusted from the first current.

The converting integrator can include a first integration block integrating a voltage according to the first current or the second current during at least a partial period of the first level period of the touch driving signal, a second integration block integrating a voltage according to the first current or the second current during at least a partial period of the second level period of the touch driving signal, and a gain buffer configured to output the sensing voltage based on the voltages integrated by the first integration block and the second integration block.

The first integration block can include a first positive integration switch electrically connected to an input end of the first current or the second current, and a positive integration capacitor electrically connected between the first positive integration switch and an input end of an integration reference voltage.

The second integration block can include a negative integration capacitor, and a first negative integration switch electrically connected to the input end of the first current or the second current and electrically connected to a node between the negative integration capacitor and the input end of the integration reference voltage.

The first positive integration switch and the first negative integration switch can alternately turned on.

A length of a period during which at least one of the first positive integration switch and the first negative integration switch is turned on can be equal to a pulse width of the touch driving signal.

The first level period of the touch driving signal can include a first sensing period and a second preset period. A period during which the first positive integration switch is turned on can overlap the first sensing period and may not overlap the second preset period.

The second level period of the touch driving signal can include a second sensing period and a first preset period. A period during which the first negative integration switch is turned on can overlap the second sensing period and may not overlap the first preset period.

The first integration block can include a second positive integration switch electrically connected between the positive integration capacitor and the input end of the integration reference voltage, and the second integration block can include a second negative integration switch electrically connected between the negative integration capacitor and the input end of the integration reference voltage.

A period during which the second negative integration switch is in a turned-on state and a period during which the second negative integration switch is in a turned-off state can be repeated during a period when the second positive integration switch maintains a turn-on state.

A length of the period during which the second negative integration switch is in the turned-on state can be larger than a length of the period during which the second negative integration switch is in the turned-off state.

The converting integrator can further include an integration reset switch electrically connected between a node between the second positive integration switch and the second negative integration switch and the gain buffer.

A circuit element included in the first integration block and the second integration block can be a circuit element for high voltage, and a circuit element included in the gain buffer can be a circuit element for low voltage. A length of a period during which the first positive integration switch is turned on can be shorter than a length of a period during which the first negative integration switch is turned on.

The current regulator can further include a power domain shifter electrically connected to an input end of the converting integrator and converting the first current from a current in a high voltage range to a current in a low voltage range.

The touch driving circuit can further include a first charge regulator electrically connected to an input end of the current regulator and adjusting a charge amount of the input current through capacitance adjustment, and a second charge regulator electrically connected between the current regulator and the converting integrator and configured to output the second current by adjusting a charge amount of the first current through current adjustment.

The second charge regulator can include a current provider, a current remover, a first charge control switch electrically connected between a node between the current regulator and the converting integrator and the current provider, and a second charge control switch electrically connected between the node between the current regulator and the converting integrator and the current remover.

A length of a period during which each of the first charge control switch and the second charge control switch is turned on once can be shorter than a pulse width of the touch driving signal.

A period during which the first charge control switch or the second charge control switch is turned on can overlap either the first level period or the second level period of the touch driving signal and may not overlap the other remaining period.

A touch driving circuit according to embodiments of the disclosure can comprise a current regulator configured to output a corrected current produced by scaling down an input current received from a touch electrode to which a touch driving signal having a first level period and a second level period is applied and a converting integrator configured to output a sensing voltage by integrating a voltage according to the corrected current in each of the first level period and the second level period of the touch driving signal.

A converting integrator according to embodiments of the disclosure can comprise a first integration block including a first positive integration switch electrically connected to an input end of a sensing current and a positive integration capacitor electrically connected between the first positive integration switch and an input end of an integration reference voltage, and integrating a voltage according to the sensing current input during the first level period of the touch driving signal, a second integration block including a negative integration capacitor and a first negative integration switch electrically connected between a node between the negative integration capacitor and the input end of the integration reference voltage and the input end of the sensing current, and integrating the voltage according to the sensing current input during the second level period of the touch driving signal, and a gain buffer configured to output the sensing voltage based on the voltages integrated by the first integration block and the second integration block.

The above description has been presented to enable any person skilled in the art to make and use the technical ideas of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide examples of the technical ideas of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

What is claimed:
1. A touch display device, comprising:
a plurality of touch electrodes disposed on or in a display panel; and
a touch driving circuit configured to drive the plurality of touch electrodes by outputting a touch driving signal having a first level period and a second level period,
wherein the touch driving circuit includes:

a current regulator configured to:
  receive an input current from at least one of the plurality of touch electrodes during at least a partial period of the first level period and at least a partial period of the second level period of the touch driving signal, and
  scale down the input current to a first current and output the first current; and
a converting integrator configured to:
  output a sensing voltage based on the first current or a second current adjusted from the first current, and
  wherein the converting integrator includes:
  a first integration block configured to integrate a voltage according to the first current or the second current during at least a partial period of the first level period of the touch driving signal;
  a second integration block configured to integrate a voltage according to the first current or the second current during at least a partial period of the second level period of the touch driving signal; and
  a gain buffer configured to output the sensing voltage based on the voltage integrated by the first integration block and the voltage integrated by the second integration block.

2. The touch display device of claim 1, wherein the first integration block includes:
  a first positive integration switch electrically connected to an input end supplied with the first current or the second current; and
  a positive integration capacitor electrically connected between the first positive integration switch and an input end of an integration reference voltage.

3. The touch display device of claim 2, wherein the second integration block includes:
  a negative integration capacitor; and
  a first negative integration switch electrically connected to the input end supplied with the first current or the second current and a node connected between the negative integration capacitor and the input end of the integration reference voltage.

4. The touch display device of claim 3, wherein the first positive integration switch and the first negative integration switch are configured to be turned on in an alternating manner.

5. The touch display device of claim 3, wherein a length of a period during which at least one of the first positive integration switch and the first negative integration switch is turned on is approximately equal to a pulse width of the touch driving signal.

6. The touch display device of claim 3, wherein the first level period of the touch driving signal includes a first sensing period and a second preset period, and
  wherein a period during which the first positive integration switch is turned on overlaps with the first sensing period and does not overlap with the second preset period.

7. The touch display device of claim 3, wherein the second level period of the touch driving signal includes a second sensing period and a first preset period, and
  wherein a period during which the first negative integration switch is turned on overlaps with the second sensing period and does not overlap with the first preset period.

8. The touch display device of claim 3, wherein the first integration block includes a second positive integration switch electrically connected between the positive integration capacitor and the input end of the integration reference voltage, and
  wherein the second integration block includes a second negative integration switch electrically connected between the negative integration capacitor and the input end of the integration reference voltage.

9. The touch display device of claim 8, wherein the converting integrator further includes an integration reset switch electrically connected between the gain buffer and a node connected between the second positive integration switch and the second negative integration switch.

10. The touch display device of claim 3, wherein the second negative integration switch is configured to be repeatedly turned on and turned off, during a period when the second positive integration switch is maintained in a turned-on state.

11. The touch display device of claim 10, wherein a length of the period during which the second negative integration switch is turned on is larger than a length of the period during which the second negative integration switch is turned off.

12. The touch display device of claim 3, wherein a circuit element included in at least one of the first integration block and the second integration block is a circuit element for high voltage, and a circuit element included in the gain buffer is a circuit element for low voltage, the high voltage being higher than the low voltage.

13. The touch display device of claim 12, wherein a length of a period during which the first positive integration switch is turned on is shorter than a length of a period during which the first negative integration switch is turned on.

14. The touch display device of claim 1, wherein the current regulator further includes a power domain shifter electrically connected to an input end of the converting integrator, the current regulator being configured to convert the first current from a current in a high voltage range to a current in a low voltage range.

15. A touch display device, comprising:
  a plurality of touch electrodes disposed on or in a display panel; and
  a touch driving circuit configured to drive the plurality of touch electrodes by outputting a touch driving signal having a first level period and a second level period,
  wherein the touch driving circuit includes:
  a current regulator configured to:
    receive an input current from at least one of the plurality of touch electrodes during at least a partial period of the first level period and at least a partial period of the second level period of the touch driving signal, and
    scale down the input current to a first current and output the first current; and
  a converting integrator configured to:
    output a sensing voltage based on the first current or a second current adjusted from the first current, and
  wherein the touch driving circuit further includes:
  a first charge regulator electrically connected to an input end of the current regulator, and configured to adjust a charge amount of the input current based on a capacitance adjustment; and
  a second charge regulator electrically connected between the current regulator and the converting integrator, and configured to output the second current based on adjusting a charge amount of the first current based on a current adjustment.

16. The touch display device of claim 15, wherein the second charge regulator includes:
- a current provider configured to supply current;
- a current remover configured to remove current;
- a first charge control switch electrically connected between the current provider and a node connected between the current regulator and the converting integrator; and
- a second charge control switch electrically connected between the current remover and the node connected between the current regulator and the converting integrator.

17. The touch display device of claim 16, wherein a length of a period during which each of the first charge control switch and the second charge control switch is turned on once is shorter than a pulse width of the touch driving signal.

18. The touch display device of claim 16, wherein a period during which the first charge control switch or the second charge control switch is turned on overlaps with one of the first level period of the touch driving signal or the second level period of the touch driving signal and does not overlap with a remaining one of the first level period of the touch driving signal or the second level period of the touch driving signal.

19. A touch driving circuit, comprising:
- a current regulator configured to:
  - receive an input current from a touch electrode to which a touch driving signal having a first level period and a second level period is applied, and
  - output a corrected current produced by scaling down the input current; and
- a converting integrator configured to:
  - receive the corrected current from the current regulator, and
  - output a sensing voltage by integrating a voltage based on the corrected current in each of the first level period and the second level period of the touch driving signal,
- wherein the current regulator further includes a power domain shifter electrically connected to an input end of the converting integrator the current regulator being configured to convert the first current from a current in a high voltage range to a current in a low voltage range.

* * * * *